(12) United States Patent
Baker et al.

(10) Patent No.: US 9,450,446 B2
(45) Date of Patent: Sep. 20, 2016

(54) CONNECTOR-FREE MAGNETIC CHARGER/WINDER

(71) Applicant: Apple Inc., Cupertino, CA (US)

(72) Inventors: John J. Baker, Cupertino, CA (US); Fletcher R. Rothkopf, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 95 days.

(21) Appl. No.: 14/263,949

(22) Filed: Apr. 28, 2014

(65) Prior Publication Data

US 2015/0311741 A1 Oct. 29, 2015

(51) Int. Cl.
*H02J 7/02* (2016.01)
*H02J 7/00* (2006.01)
*G04C 3/08* (2006.01)
*G04C 3/00* (2006.01)
*G04C 5/00* (2006.01)
*H02J 7/32* (2006.01)

(52) U.S. Cl.
CPC ............ *H02J 7/025* (2013.01); *H02J 7/0044* (2013.01); *G04C 3/00* (2013.01); *G04C 3/08* (2013.01); *G04C 5/005* (2013.01); *H02J 7/32* (2013.01); *Y02B 40/90* (2013.01)

(58) Field of Classification Search
CPC ........ H02J 7/025; H02J 7/0044; H02K 3/04; H02K 3/47; H02K 3/51
USPC ......................... 320/108, 107, 114, 116, 118
See application file for complete search history.

(56) References Cited

U.S. PATENT DOCUMENTS

| | | | | |
|---|---|---|---|---|
| 4,872,352 A * | 10/1989 | Alden | ................... | G01F 15/065 73/861.77 |
| 5,025,428 A * | 6/1991 | Jarochowski | ............ | G04C 3/00 368/126 |
| 6,208,055 B1 * | 3/2001 | Takahashi | ............... | G04C 13/11 310/156.36 |
| 6,331,744 B1 * | 12/2001 | Chen | ........................ | A61N 1/08 310/171 |
| 6,400,651 B1 * | 6/2002 | Watanabe | ................. | H02K 5/08 310/179 |
| 6,563,766 B1 * | 5/2003 | Nakamiya | .............. | G04C 10/04 320/162 |
| 7,443,135 B2 * | 10/2008 | Cho | ......................... | H02J 7/00 320/108 |
| 7,552,031 B2 * | 6/2009 | Vock | .................... | A43B 3/0005 340/539.13 |
| 8,287,143 B2 * | 10/2012 | Ford | ........................ | F21L 13/06 290/1 C |
| 8,525,358 B2 * | 9/2013 | Shuai | ........................ | H02J 7/32 290/1 E |
| 8,581,559 B2 * | 11/2013 | Botts | ......................... | H02J 7/14 310/178 |
| 8,981,721 B2 * | 3/2015 | Yamauchi | ............. | B60L 3/0046 320/116 |
| 9,153,845 B2 * | 10/2015 | Tanaka | .............. | H01M 10/0525 |

(Continued)

*Primary Examiner* — Helen Rossoshek
(74) *Attorney, Agent, or Firm* — Downey Brand LLP

(57) ABSTRACT

A method and apparatus for charging an electronic device include rotating a magnetically attractable element, or element, within the electronic device. Rotating a magnet external to the electronic device simultaneously rotates the element. Rotating the element causes an electrically generating device, such as a generator, to create an electric charge in the electronic device. The electric charge may be used to power the electrically generating device, or the electric charge may be transmitted to an internal power supply in order to charge another component or components. In another embodiment, the external magnet may wind a spring inside a device.

18 Claims, 10 Drawing Sheets

(56) References Cited

U.S. PATENT DOCUMENTS

| | | | |
|---|---|---|---|
| 2002/0167236 A1* | 11/2002 | Long | A63H 33/26 310/80 |
| 2003/0030342 A1* | 2/2003 | Chen | A47J 36/26 310/102 R |
| 2004/0004909 A1* | 1/2004 | Fujimori | G04C 10/00 368/204 |
| 2004/0206194 A1* | 10/2004 | Proano | G01D 5/145 74/89 |
| 2004/0218249 A1* | 11/2004 | Kochergin | G02F 1/09 359/280 |
| 2004/0222638 A1* | 11/2004 | Bednyak | B63J 3/04 290/1 R |
| 2005/0073284 A1* | 4/2005 | Sivasubramaniam | H02J 3/1885 322/22 |
| 2007/0026093 A1* | 2/2007 | Coates | H02J 1/16 425/97 |
| 2008/0047363 A1* | 2/2008 | Arms | B60C 23/0411 73/862 |
| 2008/0116847 A1* | 5/2008 | Loke | H02J 7/025 320/108 |
| 2008/0220411 A1* | 9/2008 | McNaughton | G01N 33/54313 435/5 |
| 2010/0182748 A1* | 7/2010 | Huang | G06F 1/1656 361/690 |
| 2011/0053454 A1* | 3/2011 | Hsu | A63H 33/26 446/136 |
| 2011/0140424 A1* | 6/2011 | Edenfeld | H02P 9/006 290/44 |
| 2011/0156518 A1* | 6/2011 | Bright | H02K 19/106 310/103 |
| 2011/0163714 A1* | 7/2011 | Ettes | H02J 7/025 320/108 |
| 2011/0273052 A1* | 11/2011 | Long | B62J 6/06 310/208 |
| 2011/0298424 A1* | 12/2011 | Yamauchi | B60L 3/0046 320/118 |
| 2012/0091728 A1* | 4/2012 | Shuai | H02J 7/32 290/1 E |
| 2012/0280657 A1* | 11/2012 | Chang | H02K 7/063 320/114 |
| 2013/0069598 A1* | 3/2013 | Tanaka | H01M 10/0525 320/134 |
| 2013/0234653 A1* | 9/2013 | Botts | H02J 7/0042 320/107 |
| 2014/0049906 A1* | 2/2014 | Aiello | F04D 29/051 361/679.49 |
| 2016/0004223 A1* | 1/2016 | Willemin | G04C 1/02 368/207 |

* cited by examiner

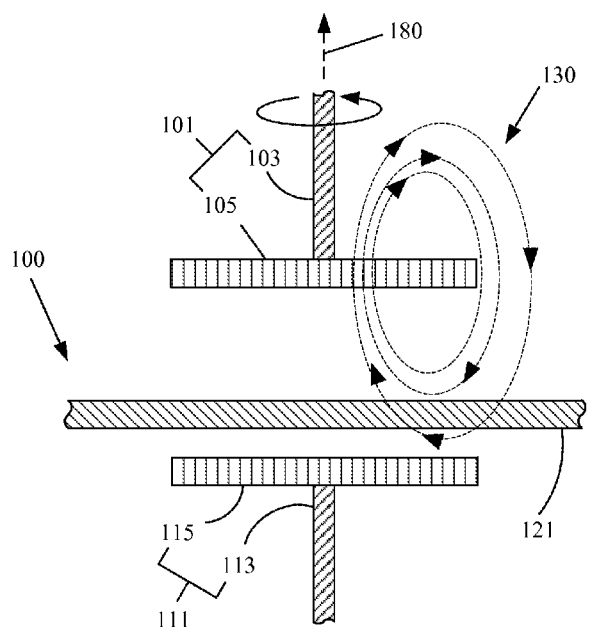
FIG. 2
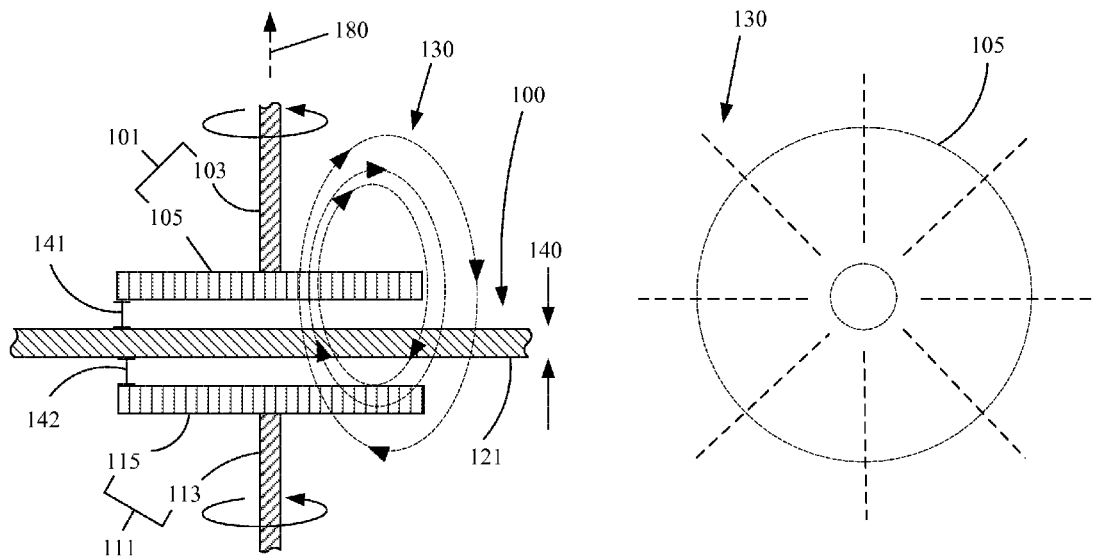
FIG. 3
FIG. 4

191

192

193

194

CONNECTOR-FREE MAGNETIC CHARGER/WINDER

FIELD

The described embodiments relate generally to driving an element using magnets. In particular, the present embodiments relate to using a magnetic field to drive an element without physically contacting the driven element.

BACKGROUND

Electronic devices (phones, audio devices, laptops, calculators, etc.) and some mechanical devices (watches, windup toys, etc.) require cyclical charging or winding. Winding a mechanical device generally requires winding a dial on an outer peripheral portion of the mechanical device. The dial is connected to a rotor shaft which may, for example, wind a spring. Winding is generally done by a user manually exerting a rotational force on the dial. This may be an inefficient method and also may be an unnecessary use of the user's energy.

Charging an electronic device generally requires connecting the electronic device to an external power source in order to draw current into, for example, a component of the electronic device. A port electrically connected to the component may receive a jack that is electrically connected to the external power source. This may require additional space and/or several components in the electronic device associated with charging. This may also limit the ability to reduce the overall footprint of the device, particularly in a portable electronic device where it may be desirable to create a relatively small device. In addition, the enclosure may include an aperture in which the port is disposed. The aperture allows ingress of dust, liquid, or other contaminants to penetrate the electronic device and cause damage. It may also prevent creating a waterproof device.

Therefore, it may be desirable to charge or wind a component without direct contact between two structures.

SUMMARY

In one aspect, a non-contact method for charging a component in an electronic device having a housing at least a portion of the housing is formed of a non-magnetic material is described. The method may include magnetically coupling an internal drive mechanism and an external drive mechanism. The internal drive mechanism may be connected to a charge generator. The method may also include causing the internal drive mechanism to rotate. The method may also include generating an amount of charge in the charge generator in accordance with the rotation of the internal drive mechanism. The method may also include passing at least some of the amount of charge to a charge storage device.

In another aspect, a portable electronic device having an enclosure is described. The portable electronic device may include a rotating member within the enclosure of the portable electronic device; the rotating member may include an element attracted to a rotating magnetic element external to the enclosure. The portable electronic device may also include a charge generator within the enclosure that receives a portion of the rotating member. The charge generator is capable of creating electrical energy.

In another aspect, a method of winding a coil element within an enclosure, the coil element magnetically attracted to a magnet outside the enclosure, is described. The method may include rotating the magnet, the rotating the magnet causes the coil element to wind from a first configuration having a first length to a second configuration having a second length, the second length less than the first length.

Other systems, methods, features and advantages of the embodiments will be, or will become, apparent to one of ordinary skill in the art upon examination of the following figures and detailed description. It is intended that all such additional systems, methods, features and advantages be included within this description and this summary, be within the scope of the embodiments, and be protected by the following claims.

BRIEF DESCRIPTION OF THE DRAWINGS

The disclosure will be readily understood by the following detailed description in conjunction with the accompanying drawings, wherein like reference numerals designate like structural elements, and in which:

FIGS. 2 and 3 show a cross sectional view of the embodiment shown in FIG. 1;

FIG. 4 shows a top view of the embodiment in FIG. 1, further showing first magnet having magnet flux lines;

Figure 1:
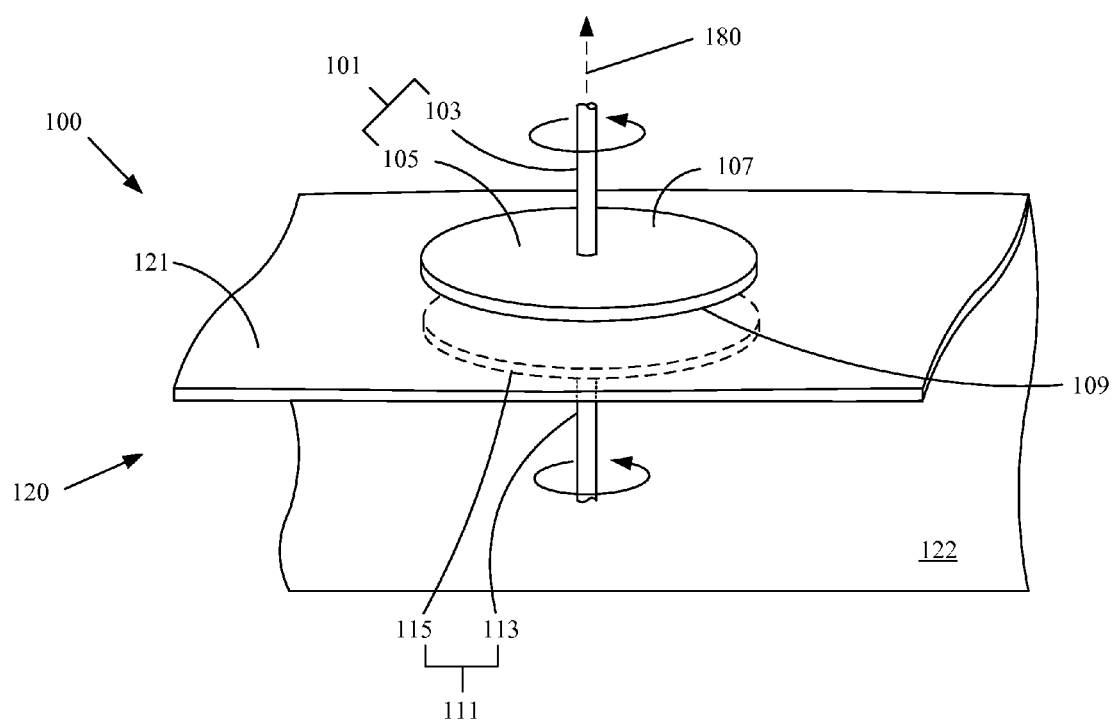
FIG. 1 shows an embodiment of an isometric view of a first member proximate to a device having a second member.
Figure 5:
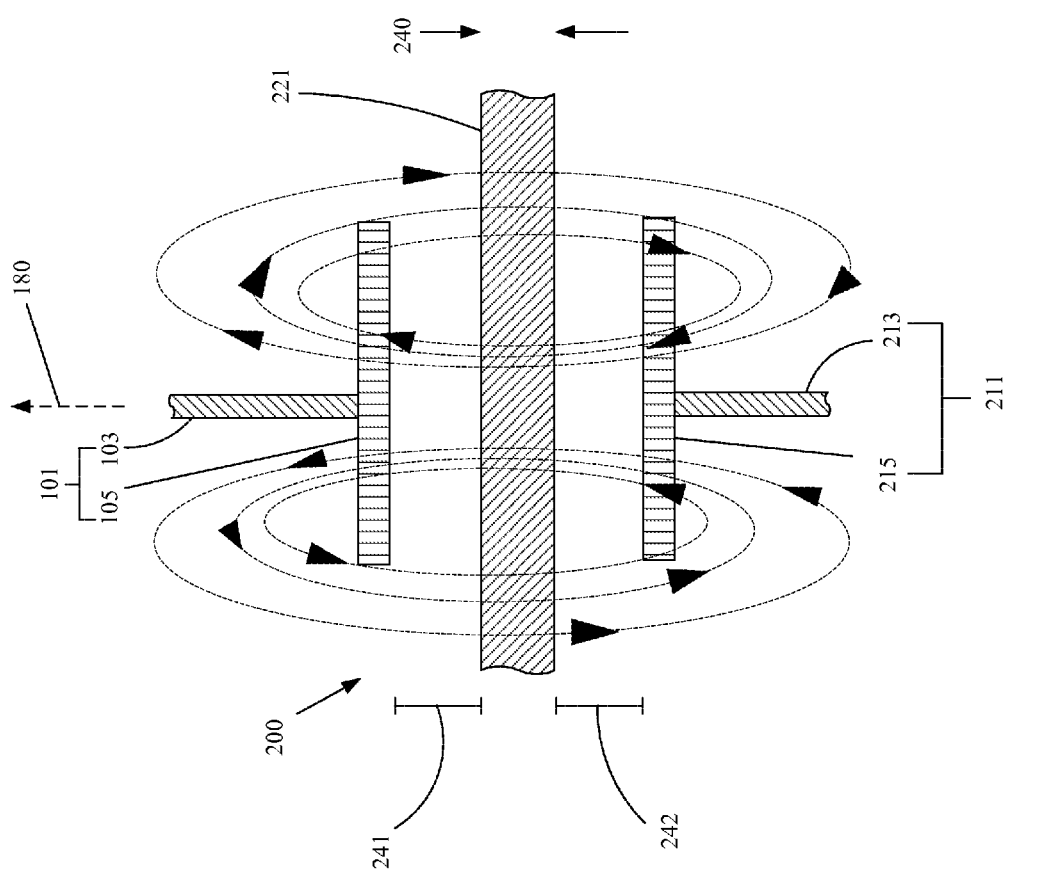
FIG. 5 shows cross sectional of another embodiment of a first member proximate to a device having a second member, the second member being a magnet.

Those skilled in the art will appreciate and understand that, according to common practice, various features of the drawings discussed below are not necessarily drawn to scale, and that dimensions of various features and elements of the drawings may be expanded or reduced to more clearly illustrate the embodiments of the present invention described herein.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

This disclosure presents a method of charging or winding a device using a rotational magnetic field. In particular, a component within the device may be rotated by a magnetic field generated externally with respect to the device. The device may include a rotor coupled to an electric generator. The rotational magnetic field causes the rotor to rotate within the electric generator allowing the electric generator to create electrical energy which may be stored by an internal power supply or transmitted to another component within the device. In another device, a rotational magnetic field may also rotate a spring disposed within the device. The spring may be a torsion spring and the device may be a timepiece. Rotating the torsional spring corresponds to actuating components within the timepiece so the timepiece may monitor time.

The rotational magnetic field may be associated with a charging or winding station external to the device. The winding or charging station may be configured to spin a "master" rotor. The master rotor is an external drive mechanism magnetically coupled with a "slave" rotor, that is, the rotor within the device. The slave rotor is associated with an internal drive mechanism configured to wind or charge the device.

The slave rotor may be made from a partially ferrous material such as iron, nickel, or steel (including 304 and 400 series stainless steel). The slave rotor may also be a magnet. In all embodiments, it is important that a magnetic circuit be closed at least momentarily such that the master rotor may rotate the slave. In some embodiments, the master rotor may be a non-ferrous conductive metal wrapped in a conductive wire. A current passing through the conductive wire may create eddy current forces that are used to couple the master rotor to the slave rotor.

For purposes of clarity, the term "longitudinal" as used throughout this detailed description and in the claims refers to a direction extending a length or major axis of a component. For example, a master shaft may rotate around a longitudinal axis the master shaft. Also, the term "plunge" as used throughout this detailed description and in the claims refers winding a spring such that the spring contracts (or coils). For example, rotating a spring at one end while holding the other end stationary may cause the spring to contract. Also, the phrase "same direction" refers to the slave rotor (which may include a magnet, spring, or ferrous element) mirroring the rotational movement of the master rotor (which may include a magnet).

These and other embodiments are discussed below with reference to FIGS. 1-16. However, those skilled in the art will readily appreciate that the detailed description given herein with respect to these Figures is for explanatory purposes only and should not be construed as limiting. Some Figures may include enlarged structures to show detail and as a result, some Figures illustrate structures that are not in proportion to other structures.

FIGS. 1-3 illustrate a device 100 having enclosure 120 which includes side wall 121 and back plate 122. Device 100 could be any device previously described. Also, device 100 may include a display (not shown) configured to display visual content from device 100.

First member 101 is external with respect to the enclosure 120 and second member 111 is disposed within the enclosure. First member 101 includes first shaft 103 and first magnet 105 attached to first shaft 103. First shaft 103 may be coupled to any rotary device (not shown) configured to rotate first shaft 103 around longitudinal axis 180 of first shaft 103. Because first shaft 103 is an external shaft associated with driving an internal shaft or element within device 100, first shaft 103 corresponds to a "master" rotor as previously discussed. Also, first shaft 103 is generally cylindrical, but could take the shape of any device generally known to rotate with a rotary device. First shaft 103 may be made from a metallic material that may or may not be attracted to magnets. Also, first shaft 103 may be made of any rigid material configured receive a torque and transmit the torque to first magnet 105. First member 101 may create a rotational magnetic field when rotated about longitudinal axis 180. In other embodiments, first shaft 103 may also be a magnet configured to couple to a shaft or magnetically attractive element within a device. Accordingly, first member 101 may only include first shaft 103.

A magnet includes two (magnetic) polarities commonly referred to as a "north pole" and a "south pole." In FIG. 1, first magnet 105 includes at least a first pole 107 and a second pole 109. First pole 107 and second pole 109 are of different polarities. For example, first pole 107 could be a north pole and second pole 109 could be a south pole. First magnet 105 also includes a magnetic field (discussed later). In some embodiments, first magnet 105 includes an array of polarity patterns having two or more "north poles" and two or more "south poles" on the top surface of first magnet 105 and on the bottom surface of first magnet 105. This may create several magnetic flux lines (discussed later) extending from the north poles to south poles on first magnet 105 in order to achieve a desired magnetic field.

First magnet 105 is generally configured to create magnetic attraction of at least one component within device 100. Also, in some embodiments, first magnet 105 is a three-, four-, or five-sided structure. In the embodiment shown in FIGS. 1 and 2, first magnet is generally rounded structure. Also, in some embodiments, the size of first magnet 105 is larger to increase the magnet field induced by first magnet 105. In other embodiments, the size of first magnet 105 is smaller to reduce the magnetic field such that other components in the device are not magnetically attracted to first magnet 105. In some embodiments, first magnet 105 is an electromagnetic (discussed later). In the embodiment shown in FIGS. 1 and 2, first magnet 105 is a permanent magnet. Also, it should be understood that first magnet 105 rotates with first shaft 103.

FIG. 1 also illustrates second member 111 includes second shaft 113 and element 115 attached to second shaft 113. Second shaft 113 may be of a similar structure and material as previously described for first shaft 103. In the embodiment shown in FIGS. 1-2, element 115 is a metal having sufficient ferrous material, or a combination of ferrous materials, to be magnetically attracted to first magnet 105 when element 115 is within a certain distance of first magnet 105. "Magnetically attracted," in this instance, refers to element 115 having a ferrous material with the opposite polarity as that of first magnet 105. In other embodiments (discussed later), element 115 is a magnet. Also, element 115 may have a similar shape as that of any structure previously described for first magnet 105.

FIGS. 2 and 3 show cross sectional views of device 100 and first member 101 illustrating the relationship required for first member 101 actuate second member 111. Back plate 122 has been removed for clarity. Magnetic flux lines 130 represent a closed magnetic circuit which, when element 115 is within magnetic flux lines 130, allows second member 111 to magnetically couple with first member 101. FIG. 2 shows first member 101 positioned a distance from device 100 such that element 115 (made from a ferrous material, discussed below) is not within magnetic flux lines 130 of first magnet 105. Accordingly, second member 111 is not actuated by the rotational magnetic field of first member 101.

However, as shown in FIG. 3, when first member 101 is positioned within a distance from device 100 such that element 115 is within magnetic flux lines 130 of first magnet 105, second member 111 is within the rotational magnetic field of first member 101. Second member 111 may now rotate in the same direction as first member 101. Further, element 115 rotates in the same direction (and approximately the same angular velocity) as first magnet 105. In other words, element 115 mirrors the rotational movement of first magnet 105. It should be understood that second shaft 113 also moves rotationally with element 115. Because second shaft 113 is associated with being driven an external shaft (such as first shaft 113), second shaft 113 corresponds to a "slave" rotor as previously discussed. Second shaft 113 may be coupled to an internal component in the device 100 configured to generate electrical energy. For example, second shaft 113 may be disposed inside a generator (not shown) such that when second shaft 113 rotates, electrical energy may be produced (discussed later). Second shaft 113 could also be coupled to a vibrational motor (or, "vibe" motor) such that when second shaft 113 rotates, electrical energy may be produced and stored within the vibrational motor.

Some magnetic flux lines 130 in FIGS. 2 and 3 are removed to show other details. FIG. 4 illustrates a top view of first magnet 105 having magnetic flux lines 130 generally extending around the entire circumference of first magnet 105. Generally, the distance that magnetic flux lines extend away from a magnet is proportional to the size and strength of the magnet.

Referring again to FIG. 3, side wall 121 and back plate 122 are generally made from magnetically neutral materials. In other words, side wall 121 and back plate 122 do not substantially affect magnetic flux lines between first magnet 105 and element 115, thereby allowing magnetic flux lines 130 to pass through side wall 121. For example, side wall 121 and back plate 122 could be made of a polymeric material, plastic, or a combination thereof. As shown in FIG. 3, side wall 121 has a thickness 140. Also, a first surface of first magnet 105 is separated by distance 141 from a first surface of side wall 121 and a first surface of element 115 is separated by a distance 142 from a second surface of side wall 121. Distance 141, thickness 140 of side wall 121, and/or distance 142 may generally be of any dimension such that element 115 is within the magnetic flux lines 130 of first magnet 105 (as shown in FIG. 2) when a user desires to mechanically rotate element 115 using first magnet 105. It should be understood that first magnet 105 is capable of mechanically actuating element 115 without any physical contact between first magnet 105 and element 115, and without first magnet or element 115 contacting side wall 121. Also, reference to components within a device in this detailed description implies the components are sufficient small enough to fit within the device. For example, an electrically generating component has a dimension smaller than the height of a side wall of a device.

Also, FIGS. 1-3 show first magnet 105 and element 115 having substantially the same shape and size. In some embodiments, first magnet 105 is larger than element. In other embodiments, first member 105 is smaller than element 115. Also, in some embodiments, first magnet 105 and element 115 do not have the same shape.

In some embodiments, it may be desirable to dispose a component further away from a side wall of a device in order to, for example, to position the component toward a central portion within the device. As such, the magnetic flux lines 130 of first magnet 105 previously described may be insufficient to form an attractive force of sufficient strength to magnetically attract element 115. In this case, it may be desirable for element 115 to be a magnet. In the embodiment shown in FIG. 5, device 200 includes second member 211 which includes second shaft 213 attached to element 215. In this embodiment, element 215 is a second magnet. As shown in FIG. 4, magnetic flux lines 230 are resultant magnetic flux lines of first magnet 105 and element 215. This allows element 215 to be magnetically attracted to first magnet 105 at a greater distance that the previous embodiment. For example, a first surface of first magnet 105 is separated by a distance 241 from a first surface of side wall 221 having thickness 240, and a first surface of element 215 is separated by a distance 242 from a second surface of side wall 221. In the embodiment shown in FIG. 5, distance 241, thickness 240, and distance 242 may each be greater than distance 141, thickness 140, and distance 142 (shown in FIG. 2). Nonetheless, first shaft 103 of first member 101 is still capable of mechanically rotating second shaft 213 of second member 211 in a similar manner described in the previous embodiment.

In other embodiments, first member 101 may only include first shaft 103 and second member 211 may only include second shaft 213, where first shaft 103 and second shaft 213 are both magnets. In this manner, first member 101 and second member 211 may both be smaller in size, yet first shaft 103 may still mechanically drive second shaft 213 through combined magnetic field lines.

Figure 6:
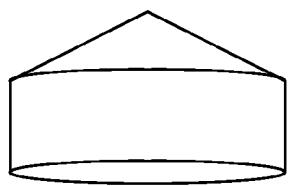
FIGS. 6-9 show embodiments of an external magnet and an internal element.
Figure 7:
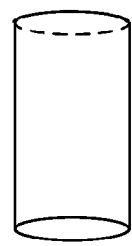
Figure 8:
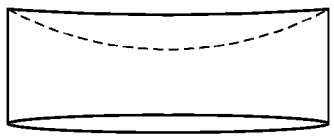

Although magnets and (internal) elements previously shown are generally circular, magnets and elements described may include a variety of shapes. For example, FIGS. 6-9 illustrate various embodiments that may be either a magnet (external to a device) or an element (within the device). Each structure shown in FIGS. 6-9 is configured to receive a rotatable shaft similar to those previously described. FIG. 6 shows an isometric side view of an embodiment of structure 191 having a triangular shape on a surface. The triangular shape may, for example, be partially received by a component having a corresponding triangular shape thereby allowing structure to be partially nested within the component and create additional space within a device. FIG. 7 shows an isometric side view of an embodiment of structure 193 having a narrow, cylindrical body which may also be partially nested in a component having a corresponding cylindrical shape. FIG. 8 shows an isometric side view of an embodiment of structure 193 having a concave surface on one end. The concave shape may, for example, allow additional space for other components within a device. The embodiments shown in FIGS. 6-8 may be made from any material previously described for a magnet or an element. Also, the embodiments shown in FIGS. 6-8 generally include a circular bottom surface. In some embodiments, structure 191, structure 192, and/or structure 193 may include a bottom surface having a three-, four-, or five-sided surface.

Figure 9:
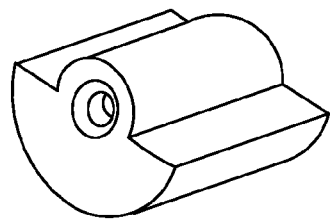

FIG. 9 shows an isometric view of an embodiment of structure 194 having an asymmetric shape. Structure 194 is generally associated with a vibrational motor and may be made from a relatively dense metal. When rotated, the eccentric mass of structure 194 may cause the body of the vibrational motor to experience movement, thereby creating a vibrational effect in, for example, an electronic device.

Figure 10:
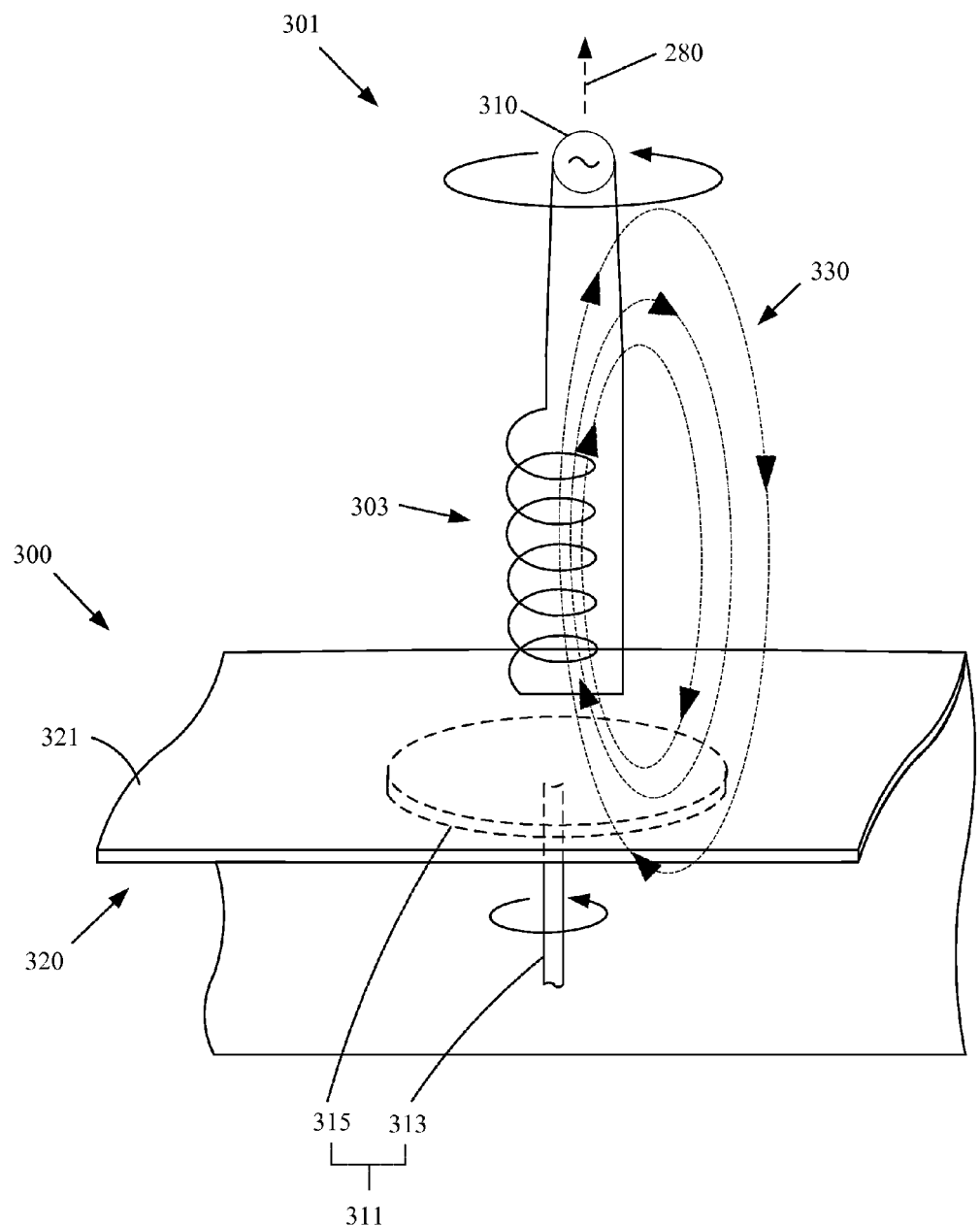
FIG. 10 shows an embodiment of an isometric view of another embodiment of a first member proximate to a device having a second member, the first member being an electromagnet.

It may also be desirable to vary the attractive field of an element external to a device, thereby allowing the element to selectively attract certain components within the device. FIG. 10 illustrates electromagnetic member 301, or simply member 301, configured to mechanically actuate second member 311 within device 300 by using an attractive field. Member 301 is configured to rotate around longitudinal axis 180 in a manner similar to that of first shaft 103 (shown in FIG. 1). Member 301 may include coil element 303 connected to power source 310. Coil element 303 generally includes several coils made from an electrically conductive material (for example, copper). In other embodiments, coil element 303 may include several additional coils. Also, in some embodiments, an exterior portion of coil element 303 may be covered with an insulating material configured to prevent current from dissipating from coil element 303. Power source 310 is configured to generate current through coil element 303.

Within enclosure 320, device 300 includes second member 311 having element 315 connected to shaft 313. Element 315 is generally a magnetically attractable structure, and may be substantially similar to element 115 (shown in FIG. 1) or element 215 (shown in FIG. 2). Also, element 315 may have a substantially similar shape and size as that of any element previously described for element 115. Also, shaft 313 may be of any shape and size previously described for second shaft 113. In some embodiments, second member 311 includes only a shaft 313 that includes a sufficient amount of ferrous material (or materials) to be attracted to member 301. When current passes through coil element 303, an electromagnetic field 330 may form. Side wall 321 is made from a material that does not substantially interfere with electromagnetic field 330. When first member 301 traverses in a direction toward second member 311 such that element 315 is within electromagnetic field 330, resultant electromagnetic forces, such as eddy currents (not shown), may form between electromagnetic field 330 and element 315 thereby giving electromagnetic field 330 magnetically attractive properties. As a result, member 301 rotating around longitudinal axis 280 of coil element 303 may mechanically actuate second shaft 313 of second member 311 in a substantially rotational manner around longitudinal axis 280. It should be understood that second shaft 313 may perform similar functions as that of second shaft 113 (shown in FIG. 1) or second shaft 213 (shown in FIG. 2).

In another embodiment not shown, electromagnet 301 may be in a stationary position. "Stationary" in this instance refers to no rotational movement. However, when electromagnet traverses in a direction toward element 315 such that element 315 is within electromagnetic field 330, eddy currents may nonetheless form between electromagnetic field 330 and element 315. Further, eddy currents may create a rotational magnetic field capable of rotationally driving element.

Some devices may be used in environments containing dust or other contaminants. As such, it may be useful to fully enclose the device to prevent or limit ingress of dust or other contaminants. Further, a fully enclosed device may be capable of being submerged under a liquid substance such as water. In the embodiment shown in FIG. 11, device 400 includes enclosure 420 having a side wall 421 connected to back plate 422. Side wall 421 and back plate 422 may be made of any material described in previous embodiments having a side wall and a back plate. A display (not shown) is coupled to side wall 421. Also, side wall 421 and back plate 422 do not include any apertures thereby reducing the probability of ingress. In order to charge certain components in an electronic device, first magnet 105, described previously, may be rotated by rotary device 102 which may include an internal motor (not shown). In some embodiments, rotary device 102 may be configured to rotate a shaft within a range of angular velocities.

Figure 11:
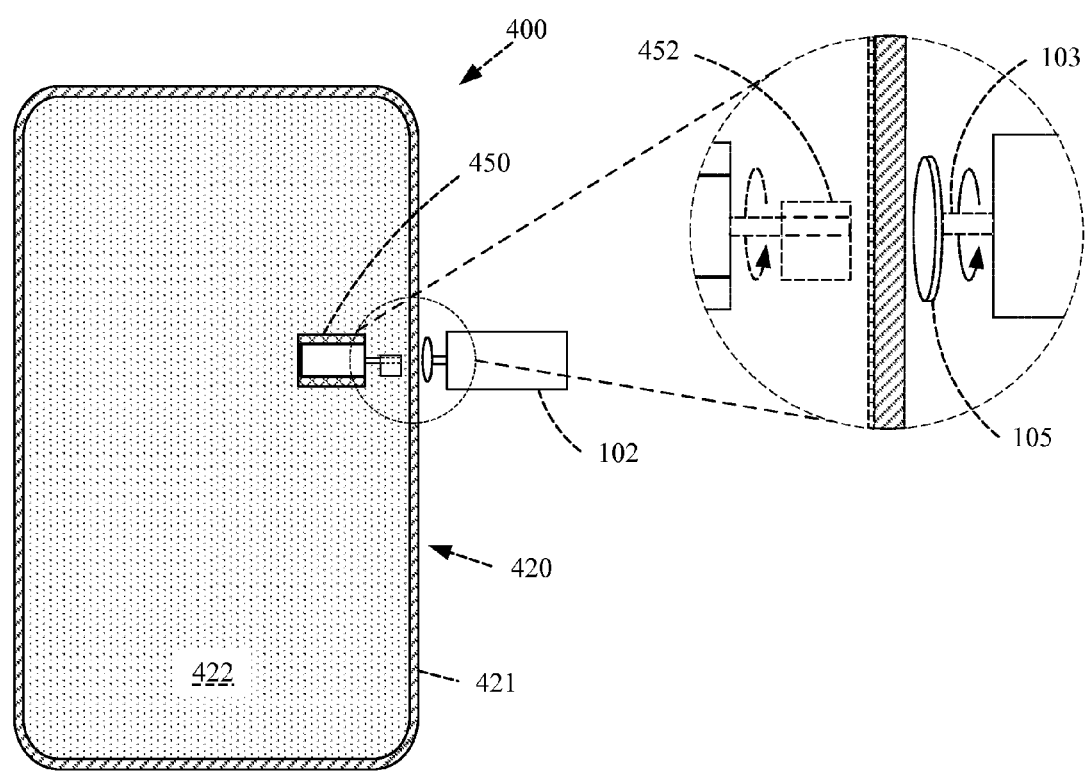
FIG. 11 shows an embodiment of a portable electronic device having an internal vibrational motor being actuated by an external magnet.

In FIG. 11, first magnet 105 is rotated near device 400 in order to charge a component 450. In the embodiment shown in FIG. 10, component 450 is a vibrational motor. Component 450 includes a vibrational head 452 having a similar shape to structure 194 shown in FIG. 9. Vibrational head 452 may be made from any ferrous material, or a combination of ferrous materials, previously described. Once vibrational head 452 is within the magnetic flux lines (not shown) of first magnet 105, vibrational head 452 may be configured to rotate when first magnet 105 is rotating. In particular, vibrational head 452 mirrors the rotational movement of first magnet 105. It should also be noted that device 400 does not include any buttons or ports proximate to enclosure 420. A port associated with charging a traditional device may be replaced by charging means described herein. Also, device 400 may be controlled by a controls displayed from a touchscreen display (not shown). However, in other embodiments, a button and/or a port may be engaged with enclosure 420.

Figure 12:
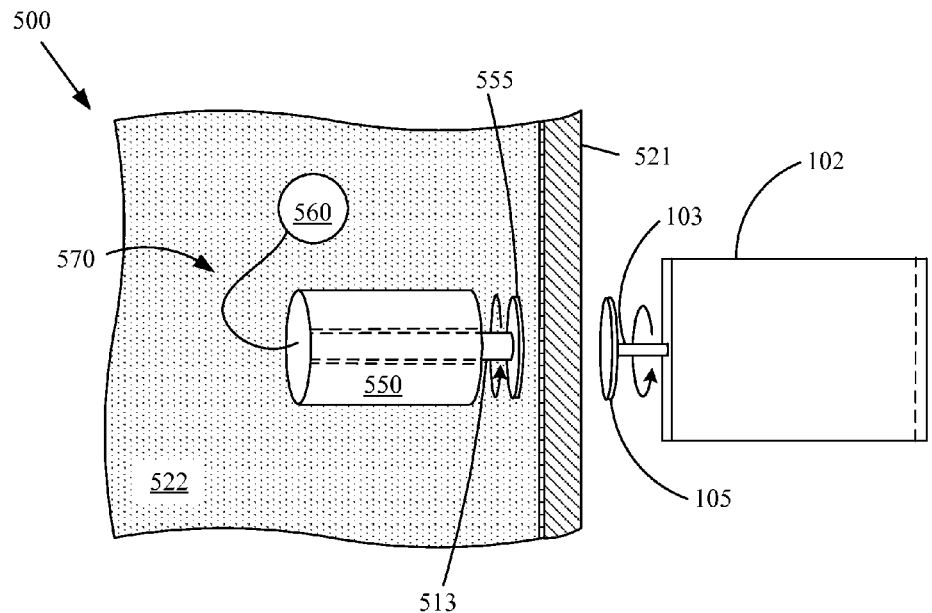
FIGS. 12 and 13 illustrate embodiments of a device having an internal energy generating component.
Figure 13:
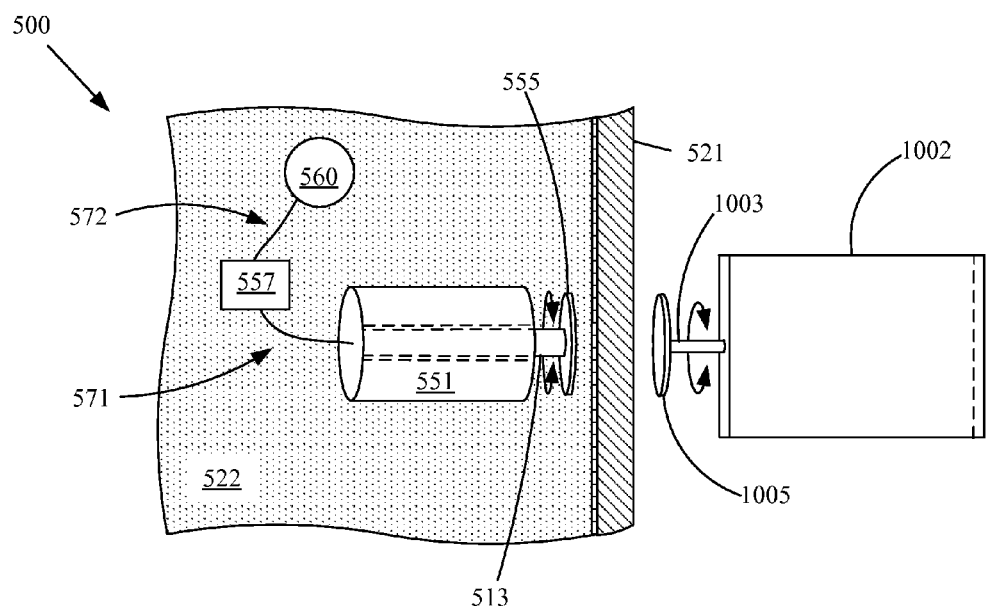

FIGS. 12 and 13 illustrate alternate embodiments of device 500 having an electrical energy generating component configured to create electrical energy for another internal component. The enclosure of device 500 could be substantially similar to that of the device shown in FIG. 11. Also, side wall 521 and back plate 522 may be made of any material described in previous embodiments having a side wall and a back plate.

In FIG. 12, generator 550 includes element 555 attached to shaft 513. Element 555 and shaft 513 may be made from any materials previously described for element 115 and shaft 113, respectively. Also, in other embodiments, shaft 513 may be a magnet and element 555 may not be included. Element 555 is configured to mirror the rotational movement of first magnet 105 when first magnet 105 and first shaft 103 are rotated by rotary device 102, and further when element 555 is within the magnetic flux lines (not shown) of first magnet 105. Shaft 513 is configured to rotate within generator 550 such that generator 550 may produce electrical energy. Generator 550 is configured to create direct current ("DC") that may be stored in an internal power supply 560 (for example, a battery) coupled to generator 550 via a conductive element 570 (such as a wire). Internal power supply 560 may be electrically connected to one or several components in device 500 requiring electrical energy.

In some embodiments, it may be more efficient, or even necessary, to create electrical energy as an alternating current ("AC"). In the embodiment shown in, FIG. 13, generator 551 is an AC generator disposed within device 500. Rotary device 1002 having first shaft 1003 attached to first magnet 1005. Rotary device 1002 is configured to rotate shaft 1003 in a first direction and in a second direction opposite the first direction. For example, the first direction could be a clockwise rotation and the second direction could be a counter-clockwise rotation. Accordingly, first magnet 1005 may also rotate in a similar manner as that of first shaft 1003. Further, rotary device 1002 may oscillate between the first direction and the second direction in a rapid manner.

Generator 551 includes shaft 513 and element 555, both of which are configured to rotate in the same direction an approximately the same angular velocity as first magnet 1005. Oscillation of rotary device 1002 corresponds to oscillation of shaft 513 within generator 551. In order to create AC, generator 551 is configured to create a positive charge, Q+, when shaft 513 is rotated in the first direction, and a negative charge, Q−, when shaft 513 is rotated in the second direction. In other embodiments, generator 551 creates a negative charge in the first direction, and a positive charge in the second direction. AC may pass from generator 551 to rectifier 557 via first conductive element 571. Rectifier 557 is configured to convert AC to DC. DC may be passed from rectifier 557 to internal power supply 560 via second conductive element 572.

The electrical charge created may be proportional to the rotational speed or angular velocity of the shaft. For example, increasing power a rotary device 102 or rotary device 1002 corresponds to increasing rotational speed of the shafts of the respective rotary devices. In turn, the electrical charge produced within generator 550 or generator 551 may also increase. It may be useful, therefore, to increase or decrease rotary device 102 or rotary device 1002 in order to achieve a desired electrical charge. For example, rapid charging of an internal power supply may be useful to reduce charging time. Also, some devices may include additional components which may then require additional charging time. For example, a tablet computing device may require additional charging time as compared a mobile device. By rotating a generator in the tablet computing device at a higher speed, the tablet computing device may be able to charge (or recharge) in the same amount of time as the mobile device.

Figure 14:
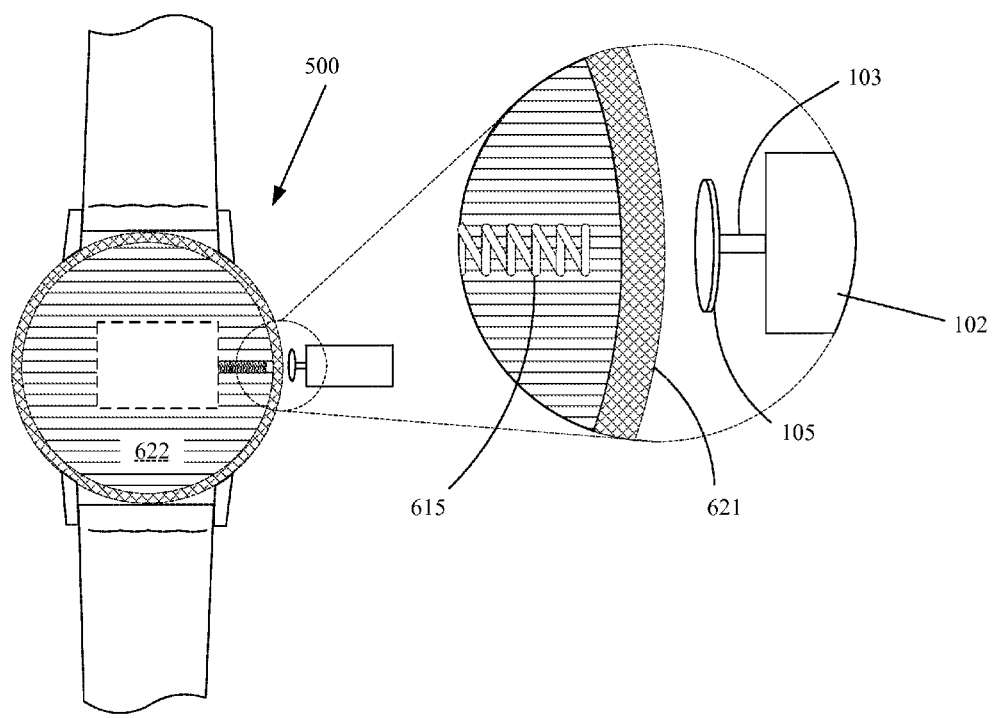
FIGS. 14 and 15 show an embodiment of a timepiece having an spring being actuated by an external magnet.
Figure 15:
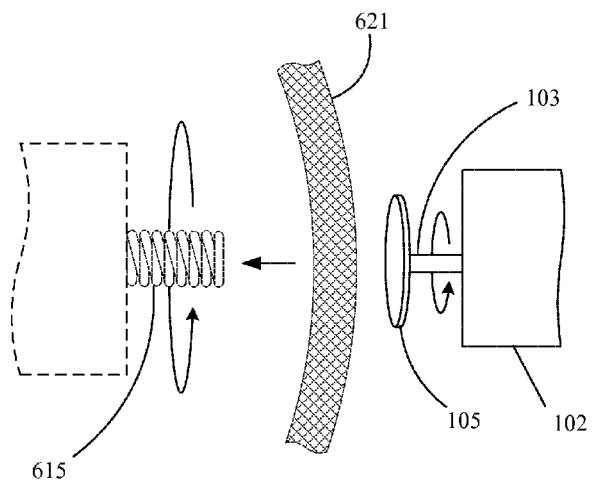

While an external rotating magnet may produce electrical energy as described, an external rotating magnet may also rotate other components configured to generate mechanical energy. Further, an external rotating magnet may be able to plunge a component in a direction away from the magnet. For example, FIGS. 14 and 15 illustrate rotary device 102 rotating first shaft 103 and first magnet 105 configured to wind a spring 615 in a timepiece 600. Timepiece 600, as shown in FIG. 12, is a watch. Spring 615 is generally made of any ferrous material, or combination of ferrous materials, previously described. For purposes of clarity, several components have been removed from timepiece 600 in FIGS. 13 and 14. FIG. 13 shows spring 615 within the magnetic flux lines (not shown) of first magnet 105. As shown in FIG. 14, when first magnet 105 is rotated, spring 615 mirrors the rotational movement of first magnet 105. In addition, spring 615 is configured to wind, and when doing so, spring 615 winds in a direction away from first magnet 105. This winding action may be similar to winding a traditional timepiece using a dial located near an outer surface of a timepiece. However, in the embodiment shown in FIGS. 14 and 15, timepiece 600 is free of external rotating components that require apertures to couple with internal components, thereby reducing the probability of ingress. It should be noted that wall 621 and back plate 622 may be made of any material described in previous embodiments having a side wall and a back plate.

In some embodiments, a spring or other component within a device may have a similar polarity to that of an external magnet. When the magnetic flux lines approach the spring, the spring may magnetically repel the external magnet. This is another method of actuating an internal component using an external magnet. However, as described, there is no need for rotational movement of the external magnet or the spring.

In additional to rotational or plunging movement, an element having magnetically attractable properties as previously described and disposed with a device may traverse laterally in a direction in response to a magnetic field created by an external magnet external. For example, an external magnet may be able to move along a side wall of a device without rotational movement. In response to the movement of the external magnet, an element within magnetic flux lines of an external magnet may mirror the movement of the external magnet to the extent the element does not come into contact with other components within the device. This lateral movement of the component may be useful to calibrate another component or to restore a displaced component.

Also, some embodiments described could be used for clocking applications. For example, a magnet external to a device could be rotated at regularly occurring pulses with a resultant rotation an element or component inside the device at the same regularly occurring pulses. This application could be used to monitor time without using a regular timekeeping device (such as a watch).

Figure 16:
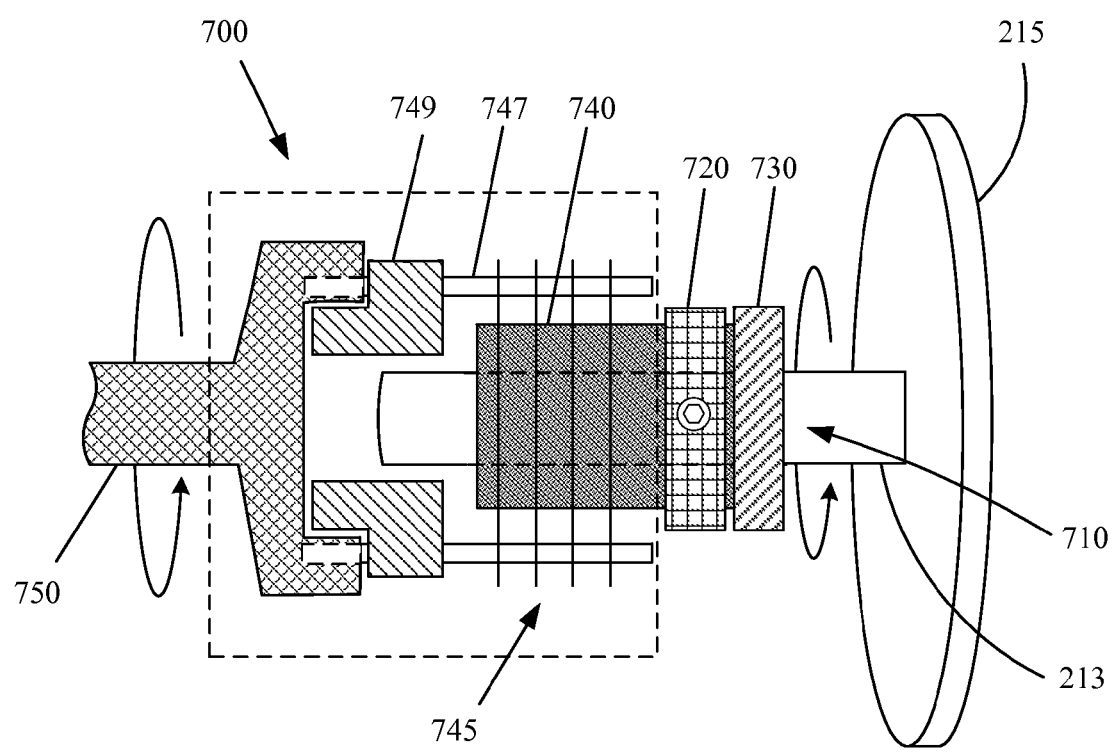
FIG. 16 illustrates an embodiment of a clutch assembly configured to limit torque to a component in an electronic device.

A rotary tool used to rotationally drive an external magnet may be capable of doing so in a range of torques. Accordingly, the external magnet may be driven at various speeds. Some speeds may be undesirable for certain internal components of a device. For example, a generator in a device that is driven at a substantially high speed may produce more electrical energy than is required. This may leave some components vulnerable to additional, unwanted charge that may cause damage to the components. Also, a mechanical device such as a spring may receive unnecessary torque that could lead to breaking the spring and/or a component coupled to the spring. In order to prevent this issue, FIG. 16 illustrates a cross section of a clutch assembly 700 configured to couple with an internal shaft of a device as well as a component configured to receive a torque (for example, a generator). Clutch assembly 700 is configured to limit torque received from rotational movement from an external magnet. Clutch assembly 700 could be used in at least some embodiments previously described.

As shown in FIG. 16, clutch assembly 700 includes receiving end 710 configured to receive second shaft 213 coupled to element 215 having magnetically attractable properties as previously described. Second shaft 213 may be secured to clutch assembly 700 by fastening member 720 and a tightening member 730 through friction pad 740. An inner surface of friction pad 740 engages an outer surface of second shaft 213. An outer surface of friction pad 740 further engages several ring elements 745 coupled to pins 747, both of which are configured to rotate with friction pad 740. Pins 747 engage housing member 749 and coupling end 750, both of which are configured to rotate with friction pad 740. In some embodiments, coupling end 750 is configured to engage a component inside the device. In other embodiments, coupling end 750 engages, and subsequently rotates, a shaft.

Friction pad 740 is configured to limit the amount of torque transmitted from second shaft 213 to coupling end 750. For example, if second shaft 213 rotates above a predetermined angular velocity (corresponding to a predetermined torque), friction pad 740 will "slip" during rotation until second shaft 213 rotates at or below the predetermined angular velocity. In other words, friction pad 740 will rotate at a lower angular velocity than that of second shaft 213. Accordingly, coupling end 750 will rotate at an angular velocity less than that of second shaft 213 (or conversely, at an angular velocity substantially similar to that of friction pad 740). In other embodiments, friction pad 740 may be configured to release from second shaft 213 when second shaft 213 is rotated above the predetermined angular velocity. Accordingly, coupling end 750 ceases to rotate until second shaft 213 rotates at or below the predetermined angular velocity where friction pad 740 may re-engage with second shaft 213.

Figure 17:
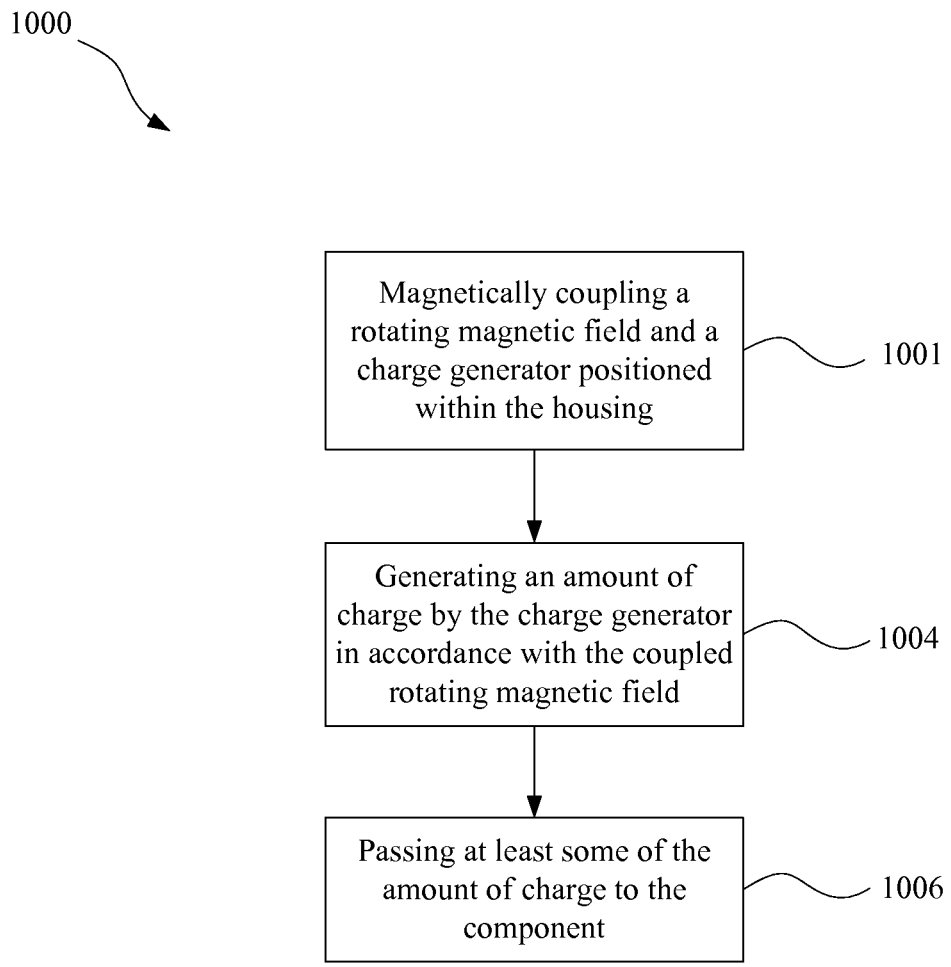
FIG. 17 illustrates a flow chart showing a method for non-contact charging of an electronic device in accordance with the described embodiments.

FIG. 17 illustrates a flow chart 1000 for a non-contact method for providing power to a component disposed in an electronic device. The electronic device includes a housing, at least part of which is formed by non-magnetic material. In a first step 1001, a rotating magnetic field is magnetically coupled with a charge generator positioned within the housing. The rotating magnetic field originates externally with respect to the electronic device, and at least some of the rotating magnetic field passes through the non-magnetic portion of the housing. In another step 1004, an amount of charge by the charge generator is generated in accordance with the coupled rotating magnetic field (that is, the rotating magnetic field and the charge generator coupled to the rotating magnetic field). As stated earlier, the amount of charge generated is proportional to the rotational speed of a rotor shaft disposed partially within the charge generator. In another step 1006, at least some of the amount of charge is passed to the component from the charge generator.

The embodiments shown in the foregoing illustrations may components capable of rotation in, for example, a clockwise direction. In other embodiments, the rotational direction may be counter-clockwise in order to achieve a desired effect.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not target to be exhaustive or to limit the embodiments to the precise forms disclosed. It will be apparent to one of ordinary skill in the art that many modifications and variations are possible in view of the above teachings.

What is claimed is:

1. A non-contact method for providing power to a component disposed in an electronic device having a housing, at least a portion of the housing is formed of a non-magnetic material, the non-contact method comprising:
    magnetically coupling a rotating magnetic field with a charge generator positioned within the housing causing the charge generator to rotate in accordance with the rotating magnetic field, wherein at least some of the rotating magnetic field passes through the non-magnetic portion of the housing;
    generating an amount of charge by the charge generator in accordance with the rotating magnetic field; and
    passing at least some of the amount of charge from the charge generator to the component.

2. The non-contact method as recited in claim 1, wherein the charge generator is coupled to an internal drive mechanism.

3. The non-contact method as recited in claim 2, wherein the rotating magnetic field is provided by a rotating magnetic element.

4. The non-contact method as recited in claim 2, wherein the rotating magnetic field is associated with an external drive mechanism free of contact with the charge generator.

5. The non-contact method as recited in claim 4, wherein the internal drive mechanism remains magnetically coupled to the external drive mechanism during rotation of the external drive mechanism.

6. The non-contact method as recited in claim 4, wherein the internal drive mechanism comprises a ferrous material that is magnetically attracted to the external drive mechanism.

7. The non-contact method as recited in claim 6, wherein the internal drive mechanism is capable of an oscillatory rotation, the oscillatory rotation comprising a first rotation and a second rotation opposite the first rotation.

8. The non-contact method as recited in claim 7, wherein the charge generator creates a first charge based upon the first rotation and a second charge based upon the second rotation, the second charge opposite the first charge.

9. The non-contact method as recited in claim 1, wherein the component is a battery.

10. The non-contact method as recited in claim 1, wherein the housing is free of apertures.

11. A portable electronic device having an enclosure defining an internal cavity, the portable electronic device comprising:
    a charge generator disposed within the internal cavity; and
    a magnetically attractable member disposed within the internal cavity and rotatably coupled to the charge generator, the magnetically attractable member configured to rotate in response to an externally applied rotating magnetic field,
    wherein the charge generator creates electrical energy based upon a rotation of the magnetically attractable member.

12. The portable electronic device as recited in claim 11, wherein the magnetically attractable member is a vibrational head of a vibrational motor within the portable electronic device.

13. The portable electronic device as recited in claim 11, wherein rotation of the magnetically attractable member mirrors rotation of the externally applied rotating magnetic field.

14. The portable electronic device as recited in claim 11, wherein the charge generator comprises a shaft and an element, and wherein the element is a magnet magnetically coupled with the magnetically attractable member.

15. The portable electronic device according to claim 11, wherein the electrical energy created within the charge generator is proportional to a rotational speed of the externally applied rotating magnetic field.

16. The portable electronic device as recited in claim 11, wherein the magnetically attractable member and the charge generator are both free of contact with a device that supplies the externally applied rotating magnetic field.

17. The portable electronic device as recited in claim 11, further comprising a battery disposed within the internal cavity, wherein the battery receives and stores the electrical energy.

18. The portable electronic device as recited in claim 11, wherein the enclosure comprises a non-magnetic portion allowing the externally applied magnet field to pass through the non-magnetic portion.

* * * * *